Sept. 29, 1964   R. B. SINGER   3,150,531
DRIVE AXLE FOR MOTOR VEHICLE
Filed Nov. 20, 1961   2 Sheets-Sheet 1

INVENTOR.
ROBERT B. SINGER
BY Mason, Kolehmainen,
Rathburn & Wyss.
ATTORNEYS

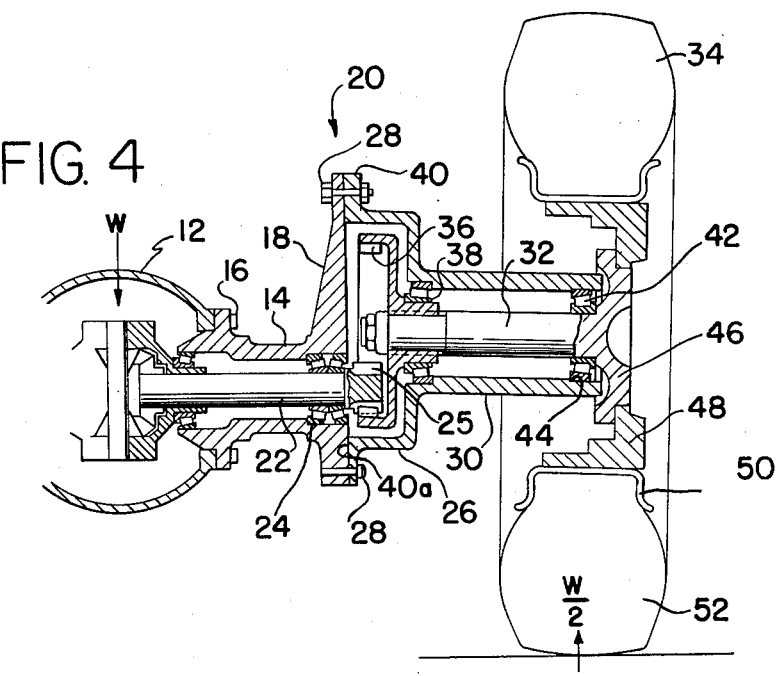
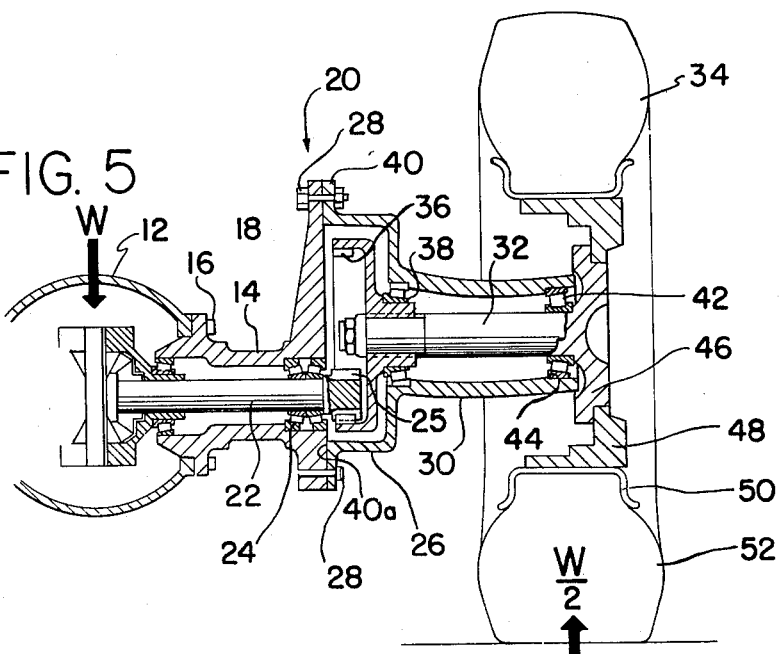

United States Patent Office 3,150,531
Patented Sept. 29, 1964

1

3,150,531
DRIVE AXLE FOR MOTOR VEHICLE
Robert B. Singer, Minneapolis, Minn., assignor, by mesne assignments, to Minneapolis-Moline, Inc., Hopkins, Minn., a corporation of Delaware
Filed Nov. 20, 1961, Ser. No. 153,557
4 Claims. (Cl. 74—390)

This invention relates to drive axles for motor vehicles and, more particularly, to drive axles of the type adapted for use on motor vehicles, such as tractors, trucks, lift trucks or the like, where high axle loadings are encountered frequently and intermittently.

In motor vehicles, such as lift trucks, which are adapted to be driven at relatively low speed, it is necessary to have a final gear reduction beyond that obtained in the regular transmission and differential. It is desirable that this final reduction be made on the drive axle from the differential to the wheel, one of the reasons being that the gear housing for this final reduction can be made so that the wheel axle can be placed at a variety of positions relative to the differential axle thus making it possible to provide a variety of different axle heights to permit use of different size wheels and also to permit different frame height constructions on the vehicle.

One of the main problems encountered in the final reduction gearing is that when the axle is loaded in a vertical direction, such as when the truck is carrying or lifting its full load capacity, the axles supporting the final reduction gearing are deflected sufficiently to displace the gears out of mesh with the result that rapid wear of these gears occurs or, under more extreme conditions, to cause slipping or interruption of drive to the wheel.

It is also desirable in a drive axle of this type that the driving wheels be canted inwardly in order to obtain maximum traction between the wheels and the running surface.

Therefore, it is an important object of the present invention to provide a new and improved drive axle for a motor vehicle or the like in which a final gear reduction is accomplished between the differential and the wheels and in which the final reduction gears mesh in ideal interfacial contact when the vehicle is loaded, thereby minimizing wear on the gear teeth.

Another object of the present invention is to provide a new and improved drive axle of the type described above wherein the drive wheels are inwardly canted for improved traction and the axle is adjustable to provide a variety of frame heights for the vehicle or to accommodate a variety of different sized wheels.

It is another object of the present invention to provide a new and improved drive axle of the type described above wherein all of the above objects are accomplished while, at the same time, utilizing a drive axle which is relatively simple in construction, light in weight, economical to manufacture and not subject to excessive wear of the driving gears so as to avoid the necessity for frequent maintenance and replacement.

The foregoing and other objects of the present invention are accomplished by providing a new and improved drive axle for a motor vehicle having a differential adapted for connection to a drive shaft or transmission of the vehicle and having a pair of differential axles extending outwardly therefrom. The outer ends of said axles terminate in final reduction gear housings and have drive pinions mounted thereon to rotate with the axles within the housings. The gear housings are comprised of inner face plates and outer casings and the outer casings have inner abutting faces which are secured to the inner face plates by a plurality of fasteners. The face plates and the outer casing can be assembled in different positions to provide a plurality of different axle heights for

2 the vehicle. The outer casings include axle tubes having wheel axles journalled therein and the wheel axles have their inner ends extending into the gear housings and their outer ends adapted to carry the wheel hubs and brake assemblies. The inner end of each wheel axle supports an internally toothed ring gear meshing with the drive pinions to accomplish the final gear reduction of the drive axle. The inner face of each outer casing is angularly crown shaved a slight amount along the plane of abutment with the face plate so that when the elements are assembled the wheel axles will not be axially parallel to the differential axles but will depend slightly downward towards their outer ends, thus providing the wheels with a slight inward cant at the bottom for greater traction. Each ring gear and its associated drive pinion is slightly misaligned when the vehicle is not loaded. When the drive axle is heavily loaded as, for example, when the lift truck is handling a large load, the outer ends of the drive axles are deflected slightly upward and the inner ends are deflected slightly downward so that the faces of the intermeshing gears in the housings are brought into ideal interfacial contact, thus greatly reducing wear on the gear teeth. Under light loads, the slight misalignment of these gears is not sufficient to cause appreciable wear.

The invention, both as to its organization and manner of operation together with further objects and advantages, will best be understood by reference to the following description when taken together with the accompanying drawing wherein.

Figure 2:
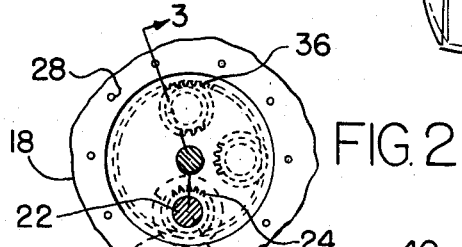
FIG. 2 is a sectional view of the final reduction gearing of the drive axle taken along a line substantially corresponding to line 2—2 of FIG. 1 and showing in broken lines various positions of the wheel axle relative to the differential axle.
Figures 3, 3A:
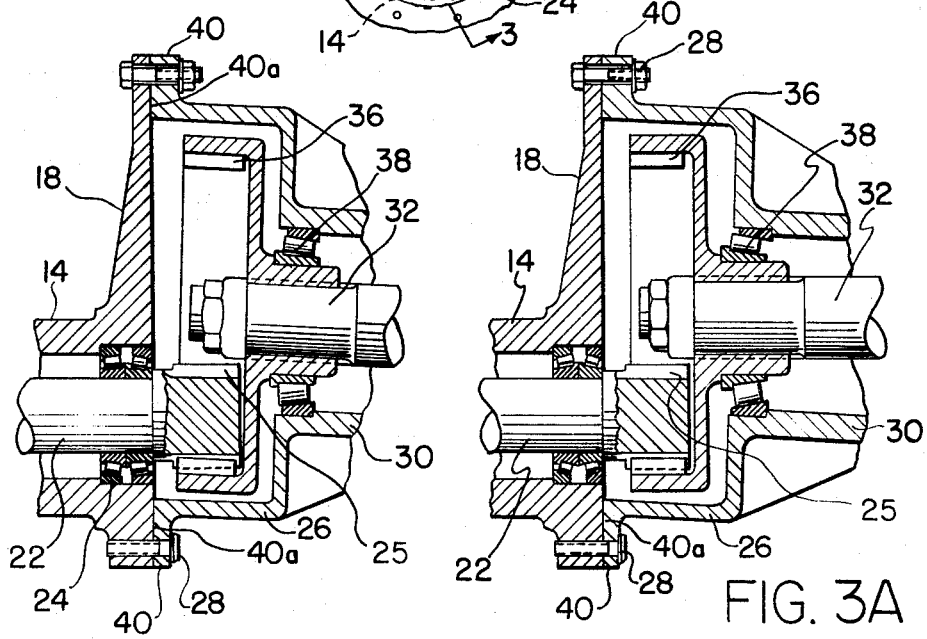

FIG. 3 is a fragmentary, sectional view of the final reduction gearing taken along a line substantially corresponding to line 3—3 of FIG. 2 (assuming that the latter shows the entire drive axle construction) and shows the misalignment of shafts when the axles are under no load condition, the misalignment being exaggerated for clarity; and FIG. 3A is a view similar to FIG. 3 but shows the alignment of the shafts when the axles are under loaded condition with the gears meshing in ideal interfacial engagement.

Figure 1:
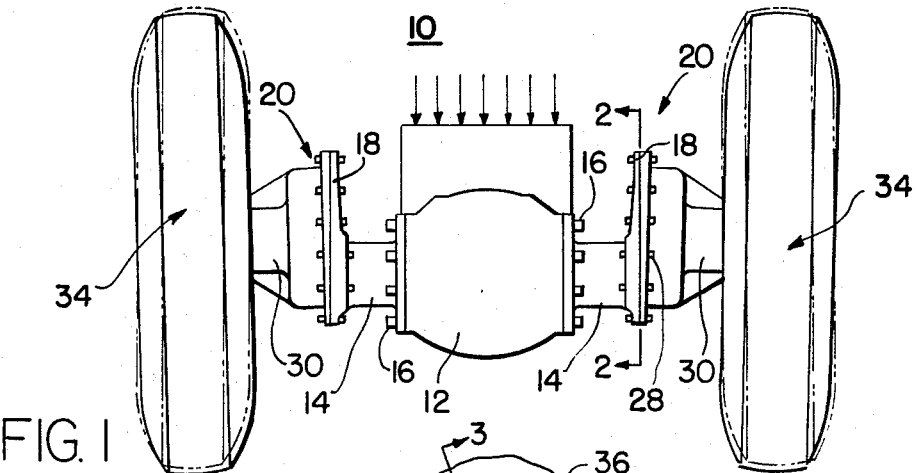
FIG. 1 is an end elevational view of a motor vehicle drive axle characterized by the features of the present invention.

FIG. 4 is a sectional view of the drive axle of FIG. 1 taken substantially along line 3—3 of FIG. 2 showing the axle in the unloaded condition.

FIG. 5 is a sectional view similar to FIG. 4 but showing the axle in the loaded condition.

Referring now to the drawing, there is illustrated a drive axle generally indicated at 10 of the type adapted for use on a motor vehicle and comprised of a differential case 12 housing a differential gear train (not shown) which is adapted to be driven by a drive shaft or directly from the transmission of the motor vehicle in conventional manner. Extending outwardly from the opposed sides of the differential case 12 are a pair of differential axle housings 14 which are secured to the case 12 by a plurality of cap screws 16 extending through a flange plate on the housing and threaded into equally spaced tapped bores in the case. The cap screws 16 are spaced equidistant from each other in a circular pattern concentric with the longitudinal axis of the axle housings 14 so that the latter housings may be secured to the case 12 in any selected one of a plurality of different positions displaced radially about the axis of the housings.

Integral with the outer ends of the axle housings 14 are a pair of eccentric flanged face plates 18 each cooperating with a gear casing 26 to form a final reduction gear housing indicated generally by the reference numeral 20. It can be seen from FIG. 2 that the face plates 18 are generally circular and each is located eccentric to its associated axle housing 14 so that when the axle housing 14 is secured in different positions relative to the case 12 as described above, the central axis of the face plates 18 is raised or lowered with respect to the central axle of the case 12 and the associated axle housing 14.

A differential axle 22 is centered within each axle housing 14 and is supported adjacent its outer end by a double roller bearing 24 seated in an annular recess formed in the outer end of the housing 14. Each axle 22 extends outwardly beyond its associated flanged face plate 18 to accommodate a pinion 25 which may be keyed or splined onto the shaft 22 for rotation therewith.

Each of the outer gear casings 26 includes an annular mounting flange 40 having a smooth inner face 40a abutting the outer face of its associated flanged face plate 18. The gear casing is secured to the plate 18 by a plurality of equally spaced bolts or cap screws 28. The outer gear casings 26 include outwardly extending axle tubes 30 for supporting drive wheel axles 32. The extreme outer ends of the drive wheel axles carry the wheel and brake assemblies generally indicated at 34 in FIG. 1, and the outer portion of the drive wheel axles 32 are supported by suitable bearings 42 carried within annular recesses 44 provided in the axle tubes 30 adjacent their outer ends. The outer ends of the axles 32 are provided with wheel carrying flanges 46 to which the wheels 48 with their rims 50 and tires 52 thereon are secured.

Internally toothed ring gears 36 are carried on the inner ends of the drive wheel axles 32 and are keyed or splined to rotate therewith. Roller bearings 38 are carried within the axle tubes 30 adjacent their inner ends and coact with the hub portions of the ring gears 36 to rotatably support the inner ends of the drive wheel axles. The teeth of the pinions 25 mesh with the internal teeth of the ring gears 36 to provide a final drive reduction over and above that produced by the vehicle transmission and the differential gearing.

In accordance with an important feature of the present invention, the face 40a of each of the flanges 40 is shaved so that, as is evident from FIGS. 3, 3A, 4 and 5, the flange is somewhat thicker at the top than at the bottom while still providing an overall planar surface to abut the smooth outer face of the associated plate 18. Thus, the axles 22 and 32 are not parallel but are slightly angularly misaligned, the misalignment being exaggerated in the drawings for clarity. In actual practice, the amount of the misalignment is very small, and in one construction which was found to provide satisfactory results, a misalignment of approximately ½° was used. This small misalignment causes the wheels 34 to cant slightly inwardly toward the bottom thus resulting in greater traction for the motor vehicle as is well known in the art. The intermeshing teeth of the pinions 25 and internal ring gears 36 are also slightly misaligned as is shown in FIGS. 3 and 4. This slight misalignment pre-stresses the drive wheel axles 32 in an opposite direction to the stresses applied to the axles when a heavy load is carried by the vehicle. Thus, the stresses encountered in the axles 32 when the vehicle is fully loaded will be partially or completely neutralized by the pre-stressing and, as a result, the useful life of the axle is extended and less wear and stress is produced on the gears. The slight misalignment of the gears when the load is not present on the axle does not cause excessive wear of the gears since the no load forces are light.

When a full load is encountered, the inner ends of the drive wheel axles 32 are deflected slightly downward to the position shown in FIGS. 3A and 5. This slight downward deflection causes the pinion 25 and internal ring gear 36 to come into ideal interfacial gear tooth engagement when the load is applied, thereby reducing wear on the gear teeth when the vehicle is running under load. The amount of misalignment can be varied in any given application to accommodate any desired load by varying the amount of the angular crown shave on the flange 40. The amount will, of course, also vary depending on the spacing of the wheels. It has been found that a workable design factor is to provide enough angular misalignment so that the gears are in optimum interfacial engagement when the truck or tractor is lifting or carrying approximately ¾ of its rated load. It has been found by tests that a drive axle constructed with a slight misalignment as described not only decreases the gear wear by an appreciable amount but also permits the use of lighter castings and smaller diameter axles.

Referring more specifically to FIGS. 4 and 5 of the drawings, when the vehicle is unloaded a relatively small force $W$ will be acting downwardly on the axle assembly and each of the wheels 34 will carry a force in the opposite direction indicated by the arrow $W/2$. The force $W/2$ acts through the tire 52, rim 50, wheel 48, flange 46 through the bearing 42 to the outer end of axle tube 30 tending to deflect it upwardly. When the vehicle is loaded and the force $w$ is increased to $W$ as shown in FIG. 5, the force $w/2$ is increased to $W/2$. The force $W/2$ causes the outer end of the axle tube 30 to deflect upwardly as shown in FIG. 5 and thus brings the wheel axle 32 into parallel alignment with the axle 22 providing ideal interfacial relation between the gear pinion 25 and ring gear 36. The wheel axle 32 is a semi-floating type axle within the housing 26 and axle tube 30 and thus when the outer end of the axle tube is deflected upwardly under the influence of a force of the magnitude of $W/2$ the outer end of the wheel axle 32 is carried upwardly also. This action brings the inner gear carrying end of the wheel axle 32 into parallel relation with the axle 22 resulting in reduced gear wear under load.

If it is desired to adjust the height of the drive axle the bolts 16 holding the axle housings 14 to the differential case 12 are removed and the housings are rotated relative to the differential case to obtain the desired height setting for the flanges 18. The bolts 16 are then reinserted securing the housings 14 in the new position. The bolts 28 holding the flanges 18 and the outer gearing casings 26 together are removed and the casings 26 are rotated relative to the flanges 18 so that the axes of the axles 22 and 32 will lie in the same vertical plane with the outer ends of the axles 32 depending slightly downward from the horizontal. Thus, the drive axle 10 can be adjusted to a number of desired heights without affecting the plane of misalignment of the axles 22 and 32, which is always vertical wtih the outer ends of the axles 32 depending slightly downward.

Having thus described the invention, it is to be understood that various changes in form, details, arrangements and proportions of the parts will occur to those skilled in the art without departing from the invention and the appended claims are, therefore, intended to cover any and all such modifications as may fall within the true spirit and scope of this invention.

What is claimed as new and desired to be secured by Letters Patent of the United States is:

1. A gear reduction for use on a vehicle of the type adapted to be operated loaded and empty, and comprising a gearing housing angularly deflectable when said vehicle is in a loaded condition, a driving shaft extending into said housing and supported for rotation thereon, a gear mounted on said driving shaft within said housing, a driven shaft carrying one wheel of the vehicle, bearing means within said housing and deflectable therewith for rotation within said housing, said driving shaft extending outwardly beyond the end of said driven shaft slightly misaligned from parallel relation therewith when said vehicle is in an empty condition; said driven shaft being angularly deflectable into substantially parallel relation with said driving shaft by said deflection of said gear housing, gear means connected to said driven shaft within said housing and driven by said gear, and means mounting said driven and driving shafts within said housing with their axes in said slightly misaligned relation from parallel with each other when the vehicle is empty in an amount substantially equal and opposite to the angular deflection of said driven shaft when said vehicle is loaded.

2. The apparatus defined by claim 1 wherein said gear housing comprises an inner housing portion including means rotatably supporting said driving shaft, an outer gear housing portion having a generally annular flange plate thereon having an abutting face engaging said inner housing portion to define said gear housing, said bearing means rotatably supporting said driven shaft within said outer gear housing portion, the abutting face of one of said housing portions having a planar surface inclined slightly from a plane normal to the axis of said driven shaft, whereby said driven shaft depends slightly downward at its outer wheel carrying end, the amount of inclination of said driven shaft being substantially angularly equal to said angular deflection of said driven shaft when the vehicle is loaded.

3. A drive axle for a wheeled vehicle of the type adapted to be operated loaded and empty, and comprising a differential case, a differential drive mechanism housed within said differential case, said case having opposite ends forming annular concentric faces parallel to each other and defining opposed apertures in said case, a pair of axially aligned drive axles driven by said drive mechanism extending outwardly therefrom concentric with and axially normal to said faces, a pair of drive axle housings concentrically positioned around said drive axles, said drive axle housings having inner flanged ends radially disposed to abut said annular faces in sealing relations, fastening means for securing said flanged ends to said annular faces in a plurality of selective rotative relative positions, radially disposed eccentric flanges formed at the outer ends of said drive axle housings having circular outer faces normal to said drive axles, bearing means adjacent the outer ends of said drive axle housings for rotatively supporting said drive axles within said housing, pinion gears secured to said drive axles outwardly from said eccentric flanges, gear housing members concentric with said eccentric flanges and having annular faces abutting said eccentric flange faces in sealing relationship to form a closed gear housing, said gear housing members including integral wheel axle housings concentric with said gear housings and being deflectable when said vehicle is in a loaded condition, wheel axles concentric with said wheel axle housings having inner ends extending into said gear housings, bearing means carried in said wheel axle housings for rotatively supporting said wheel axles therein, said gear housing members supporting said wheel axles in slightly angularly misaligned position from said drive axles when said vehicle is in an empty condition, said axles being deflectable with said wheel axle housings when said vehicle is in a loaded condition, internal ring gears secured on the inner ends of said wheel axles with said gear housings and intermeshing with said pinion gears, the annular faces of said gear housing members having a planar face at slight angular disposition to a plane normal to said wheel axles equal to the angular misalignment between said axles whereby said wheel axles are slightly downwardly disposed at their outer ends so that as the drive axle is loaded in a downward direction the deflection of the inner ends of the wheel axles is such that the pinions and ring gears are in proper intermeshing contact, and fastening means for securing said gear housings to said eccentric flanges in a plurality of selective rotative relative positions.

4. A drive axle construction for a wheeled motor vehicle of the type including a differential case containing a differential gear train therein; said construction including a pair of co-axial differential axles driven by and extending outwardly in opposite directions from said gear train; a pair of pinions, each driven by and mounted adjacent an outer end of one of said differential axles; a pair of differential axle housings, each attached to and extending outwardly from said differential case; a pair of gear casings each including an outwardly extending axle tube, said gear casings attached to and extending outwardly from respective ones of said differential axle housings; a pair of drive wheel axles, each mounted for rotation in one of said gear casings and having a gear mounted adjacent its inner end in meshing engagement with and driven by one of said pinions, each of said drive wheel axles having an outer end adapted for carrying a vehicle wheel; the outer ends of said drive wheel axles positioned slightly below the inner ends thereof providing a slight angular misalignment between the drive wheel axles and the differential axles when the vehicle is unloaded, said drive wheel axles being angularly carried into parallel alignment with said differential axles when said vehicle is subjected to a given load; each of said differential axle housings including a portion having an annular mounting flange at the inner end thereof, means for securing said mounting flange to said differential case in any selected one of a plurality of different positions displaced radially about said differential axles, said differential axle housing having a flanged face plate adjacent its outer end disposed eccentrically of said differential axles forming one wall of said gear casing; said gear casing including a flanged inner end portion having an annular face thereon adapted to fit against said one wall to form said gear casing enclosing said gear and intermeshing pinion, and means for securing said one wall and said flanged inner end portion together in any selected one of a plurality of different positions displaced radially about said drive wheel axle upon securing said mounting flange to said differential case in a selected one of said first-mentioned plurality of different positions, thereby to permit the adjustment of the height of the wheel carrying axles relative to the differential case and yet maintain a downward angular misalignment between said drive wheel axles and said differential axles when the vehicle is unloaded.

References Cited in the file of this patent

UNITED STATES PATENTS

| | | |
|---|---|---|
| 790,844 | Jones | May 23, 1905 |
| 963,557 | Hill | July 5, 1910 |
| 963,874 | Daimler | July 12, 1910 |
| 1,455,084 | Diller | May 15, 1923 |
| 2,570,191 | Beckwith | Oct. 9, 1951 |

FOREIGN PATENTS

| | | |
|---|---|---|
| 731,342 | France | May 30, 1932 |
| 574,166 | Italy | Mar. 13, 1958 |